_(12)_ United States Patent
Jennings et al.

(10) Patent No.: US 10,961,854 B2
(45) Date of Patent: Mar. 30, 2021

(54) DIRT FUNNEL SQUEALER PURGES

(71) Applicant: United Technologies Corporation, Farmington, CT (US)

(72) Inventors: Timothy J. Jennings, West Hartford, CT (US); Mark F. Zelesky, Bolton, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 156 days.

(21) Appl. No.: 16/129,457

(22) Filed: Sep. 12, 2018

(65) Prior Publication Data

US 2020/0080428 A1  Mar. 12, 2020

(51) Int. Cl.
*F01D 5/18* (2006.01)
*F01D 5/28* (2006.01)
*F01D 9/04* (2006.01)

(52) U.S. Cl.
CPC .............. *F01D 5/187* (2013.01); *F01D 5/186* (2013.01); *F01D 5/28* (2013.01); *F01D 9/041* (2013.01); *F05D 2220/32* (2013.01); *F05D 2240/12* (2013.01); *F05D 2240/301* (2013.01); *F05D 2260/202* (2013.01)

(58) Field of Classification Search
CPC .......... F01D 5/187; F01D 5/186; F01D 9/041; F01D 5/20; F05D 2240/301; F05D 2260/202; F05D 2250/323; F05D 2260/607; F05D 2240/307
See application file for complete search history.

(56) References Cited

U.S. PATENT DOCUMENTS

| 7,695,243 | B2 |   | 4/2010  | Lee et al. |
|-----------|----|---|---------|-----------------------|
| 8,011,889 | B1 | * | 9/2011  | Liang .............. F01D 5/20 |
|           |    |   |         | 415/173.1 |
| 8,435,004 | B1 | * | 5/2013  | Liang .............. F01D 5/187 |
|           |    |   |         | 416/92 |
| 8,568,097 | B1 |   | 10/2013 | Liang |
| 8,647,071 | B2 | * | 2/2014  | Pons ................ F01D 5/20 |
|           |    |   |         | 416/228 |
| 9,856,739 | B2 | * | 1/2018  | Bedrosyan ........ F01D 5/20 |
| 10,012,089| B2 | * | 7/2018  | Quach ............. F01D 5/20 |

(Continued)

FOREIGN PATENT DOCUMENTS

| EP | 0340149 A1 * | 11/1989 | ............. F01D 5/18 |
| EP | 1362982 A1 * | 11/2003 | ............. F01D 5/186 |

(Continued)

OTHER PUBLICATIONS

European Patent Office, European Search Report dated Feb. 13, 2020 in Application No. 19197090.4.

*Primary Examiner* — Ninh H. Nguyen
*Assistant Examiner* — Brian Christopher Delrue
(74) *Attorney, Agent, or Firm* — Snell & Wilmer LLP (57) ABSTRACT

A component for use in a gas turbine engine includes a channel configured to port a gas from an inlet along a flow path. The component further includes a wall defining an outlet configured to receive the gas, the wall forming an angle with the flow path that is between 60 degrees and 120 degrees, the outlet having a first portion with a first diameter and a second portion with a second diameter, the first portion configured to receive the gas before the second portion, and the first diameter being greater than the second diameter.

16 Claims, 6 Drawing Sheets

(56) References Cited

U.S. PATENT DOCUMENTS

| | | | |
|---|---|---|---|
| 2003/0021684 A1* | 1/2003 | Downs | F01D 5/145 416/92 |
| 2008/0044289 A1* | 2/2008 | Klasing | F01D 5/20 416/235 |
| 2010/0111704 A1* | 5/2010 | Hada | F01D 5/20 416/97 R |
| 2013/0266454 A1* | 10/2013 | Mongillo, Jr. | F01D 5/20 416/97 R |
| 2014/0030101 A1* | 1/2014 | Mishra | F01D 5/20 416/223 R |
| 2014/0030102 A1* | 1/2014 | Mishra | F01D 5/20 416/223 R |
| 2014/0047842 A1* | 2/2014 | Chlus | F01D 5/20 60/726 |
| 2015/0330228 A1* | 11/2015 | Quach | F01D 5/187 416/95 |
| 2016/0341046 A1* | 11/2016 | Feldmann | F01D 5/187 |
| 2019/0186273 A1* | 6/2019 | Halfmann | F01D 5/187 |

FOREIGN PATENT DOCUMENTS

| | | | | |
|---|---|---|---|---|
| EP | 3498975 A1 * | 6/2019 | | F01D 5/187 |
| GB | 1188401 A * | 4/1970 | | F01D 5/187 |
| GB | 2382383 A * | 5/2003 | | F01D 5/187 |
| GB | 2402715 A * | 12/2004 | | F01D 5/187 |
| WO | WO-0019065 A1 * | 4/2000 | | B22C 9/103 |
| WO | WO-2005068783 A1 * | 7/2005 | | F01D 5/187 |
| WO | WO-2005095761 A1 * | 10/2005 | | F01D 5/187 |
| WO | WO-2016076834 A1 * | 5/2016 | | F01D 5/187 |
| WO | WO-2018143997 A1 * | 8/2018 | | F01D 5/20 |

\* cited by examiner

DIRT FUNNEL SQUEALER PURGES

FIELD

The present disclosure relates generally to gas turbine engines and, more particularly, to turbine blades of gas turbine engines designed to reduce bonding between walls of the turbine blades and debris from a flow of cooling gas.

BACKGROUND

Gas turbine engines include compressor sections to compress an airflow, combustor sections that combine the airflow with fuel for combustion and generate exhaust, and turbine sections that convert the exhaust into torque to drive the compressor sections. The turbine sections may include rotating turbine blades that may be exposed to relatively high temperatures. The turbine blades include cooling features that port a cooling airflow therethrough in order to offset some effects of heat. In response to contact between debris within the cooling airflow and an internal surface of the turbine blade, the debris may undesirably bond to the internal surface of the turbine blades.

SUMMARY

Described herein is a component for use in a gas turbine engine. The component includes a channel configured to port a gas from an inlet along a flow path. The component further includes a wall defining an outlet configured to receive the gas, the wall forming an angle with the flow path that is between 60 degrees and 120 degrees, the outlet having a first portion with a first diameter and a second portion with a second diameter, the first portion configured to receive the gas before the second portion, and the first diameter being greater than the second diameter.

In any of the foregoing embodiments, the wall defines a plurality of outlets each having first portions with first diameters and second portions with second diameters that are less than the first diameters.

In any of the foregoing embodiments, the component is an airfoil, and the wall is an outer diameter wall.

Any of the foregoing embodiments may further include a squealer configured to receive the gas from the outlet.

In any of the foregoing embodiments, the airfoil is a blade of a turbine section of the gas turbine engine.

In any of the foregoing embodiments, the flow path has a first straight section, a first turn, and a second straight section such that the gas flows through the first straight section, then through the first turn, and then through the second straight section, wherein the wall defines a portion of the first turn.

In any of the foregoing embodiments, the outlet has a funnel shape that funnels from the first portion towards the second portion.

In any of the foregoing embodiments, the wall has a first surface facing the flow path and having a first surface area, and a second surface opposite the first surface and having a second surface area that is less than the first surface area.

Also disclosed is a component for use in a gas turbine engine. The component includes a channel configured to port a gas from an inlet along a flow path. The component further includes a wall defining an outlet configured to receive the gas, the wall forming an angle with the flow path that is between 60 degrees and 120 degrees, and having a first surface facing the flow path and having a first surface area, and a second surface opposite the first surface and having a second surface area that is less than the first surface area.

In any of the foregoing embodiments, the outlet has a first portion located on the first surface and having a first diameter, and a second portion located on the second surface and having a second diameter that is less than the first diameter.

In any of the foregoing embodiments, the flow path has a first straight section, a first turn, and a second straight section such that the gas flows through the first straight section, then through the first turn, and then through the second straight section, wherein the wall defines a portion of the first turn.

In any of the foregoing embodiments, the wall defines a plurality of outlets each having first portions with first diameters and second portions with second diameters that are less than the first diameters.

In any of the foregoing embodiments, the component is an airfoil, and the wall is an outer diameter wall.

Any of the foregoing embodiments may also include a squealer configured to receive the gas from the outlet.

In any of the foregoing embodiments, the airfoil is a blade of a turbine section of the gas turbine engine.

In any of the foregoing embodiments, the outlet has a funnel shape that funnels from the first surface towards the second surface.

Also disclosed is a turbine section of a gas turbine engine having an axis. The turbine section includes a vane configured to turn exhaust. The turbine section also includes a blade configured to rotate about the axis. The blade includes a channel configured to port a gas from an inlet along a flow path. The blade further includes a wall defining an outlet configured to receive the gas, the wall forming an angle with the flow path that is between 60 degrees and 120 degrees, the outlet having a first portion with a first diameter and a second portion with a second diameter, the first portion configured to receive the gas before the second portion, and the first diameter being greater than the second diameter.

In any of the foregoing embodiments, the wall has a first surface facing the flow path and having a first surface area, and a second surface opposite the first surface and having a second surface area that is less than the first surface area.

In any of the foregoing embodiments, the blade may further include a squealer, wherein the wall is an outer diameter wall, and the squealer is configured to receive the gas from the outlet.

In any of the foregoing embodiments, the flow path has a first straight section, a first turn, and a second straight section such that the gas flows through the first straight section, then through the first turn, and then through the second straight section, wherein the wall defines a portion of the first turn.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
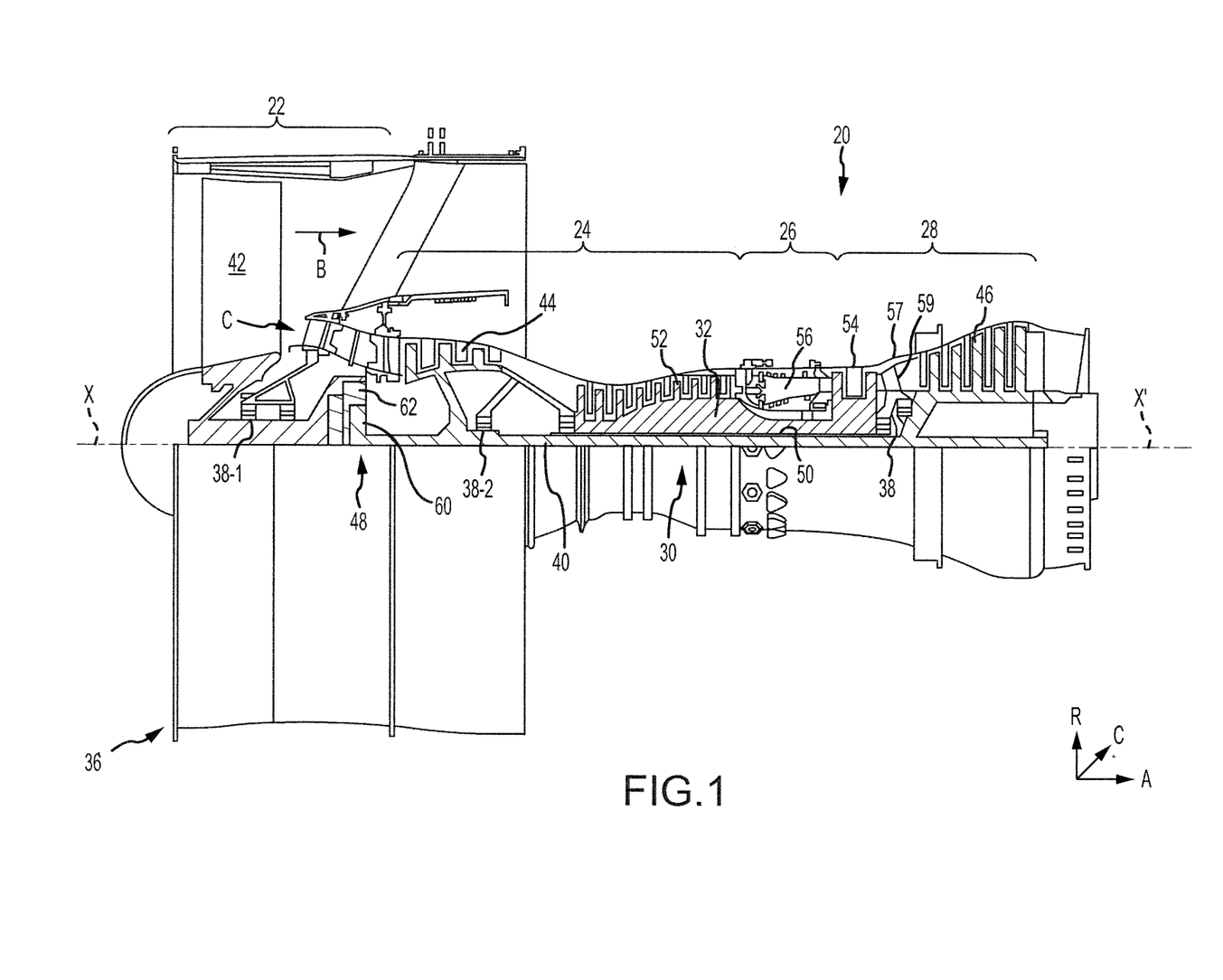
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
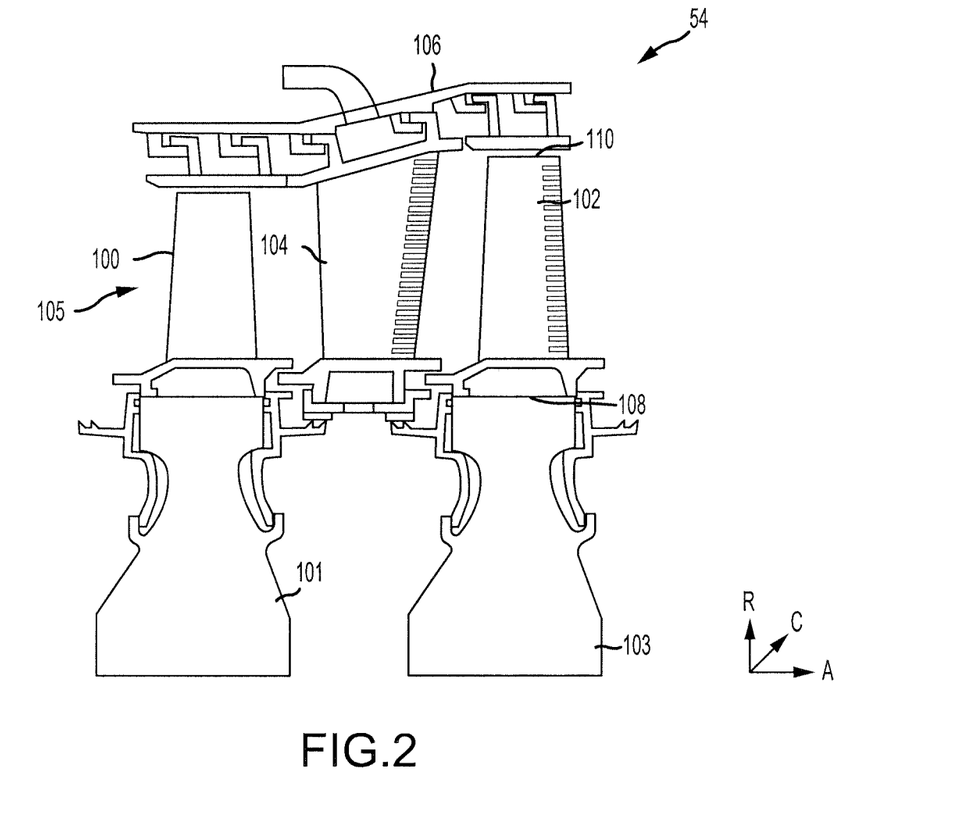
FIG. 2 is a cross-sectional view of a portion of a high pressure turbine section of the gas turbine engine of FIG. 1, in accordance with various embodiments.

Referring now to FIGS. 1 and 2, the high pressure turbine section 54 may include multiple airfoils 105 including multiple rows, or stages, of blades including a first blade 100 and a second blade 102, along with rows, or stages, of vanes located therebetween including a vane 104. The blades 100, 102 may be coupled to discs 101, 103 respectively which facilitate rotation of the blades 100, 102 about the axis X-X' in response to receiving exhaust from the combustor section 56. The vane 104 may be coupled to a case 106 and may remain stationary relative to the axis X-X'. The vane 104 may turn the exhaust so that it is received by the blade 102 in a desired direction.

The blade 102 may include an inner diameter edge 108 and an outer diameter edge 110. Due to relatively high temperatures within the high pressure turbine section 54, it may be desirable for the blade 102 (and the vane 104) to receive a flow of cooling air. In that regard, the blade 102 may receive a cooling airflow from the inner diameter edge 108 or the outer diameter edge 110. The blade 102 may define air passages that transport the cooling airflow through the blade 102 to the other of the inner diameter edge 108 or the outer diameter edge 110.

Figure 3:
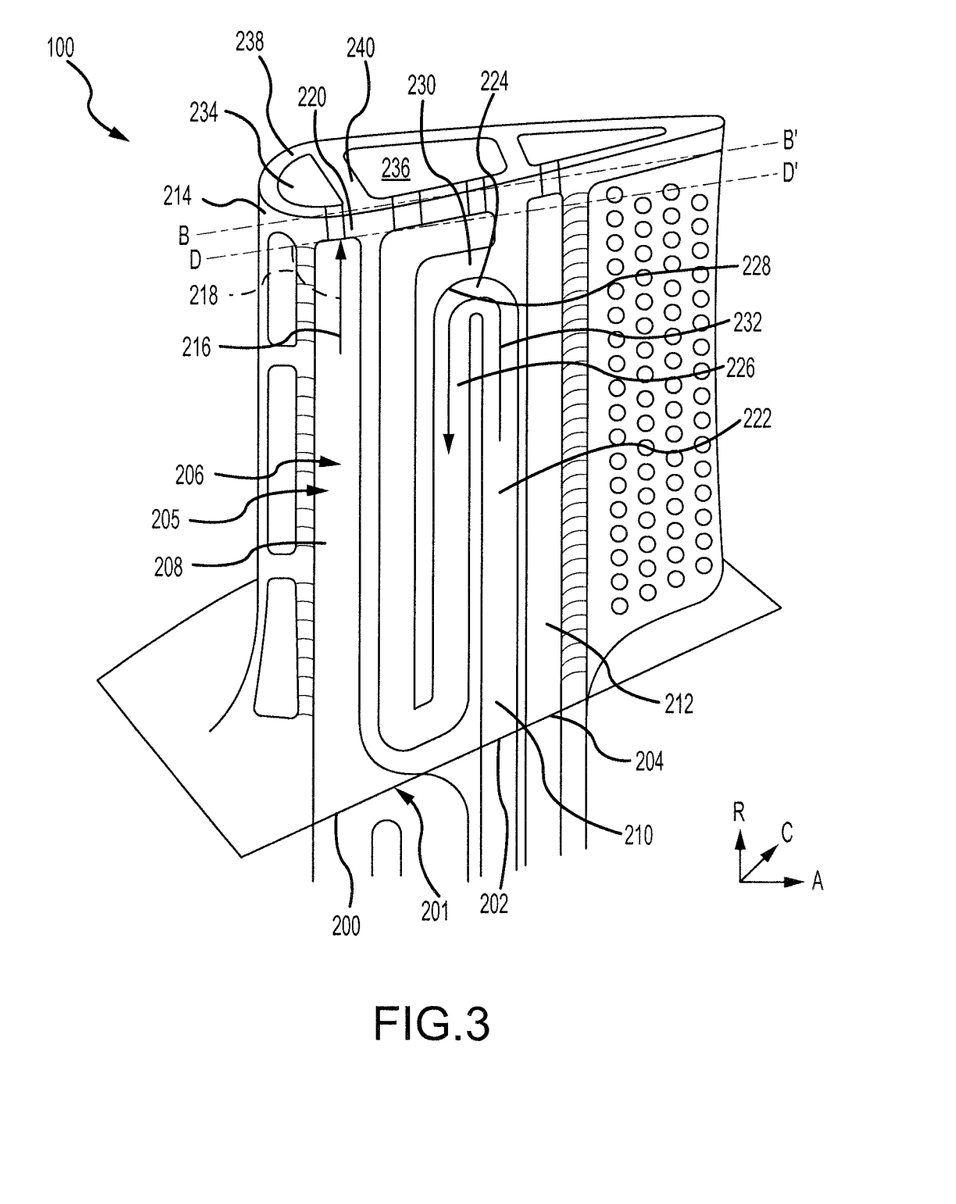
FIG. 3 is an enlarged view of a blade of the high pressure turbine section of FIG. 2, in accordance with various embodiments.

Referring now to FIG. 3, an enlarged view of the blade 100 is shown. The blade 100 includes a plurality of inlets 201 for receiving a gas, such as a cooling airflow. In particular, the blade 100 includes a first inlet 200, a second inlet 202, and a third inlet 204. The blade 100 further includes a plurality of channels 205 that define flow paths 206 for porting the cooling airflow through the blade 100. In particular, the blade 100 includes a first flow path 208, a second flow path 210, and a third flow path 212. Although the particular blade 100 shown in FIG. 3 includes three inlets 201 and three flow path 206, the disclosure is equally applicable to a blade having any quantity of inlets and flow paths, and any configuration thereof.

Figure 7:
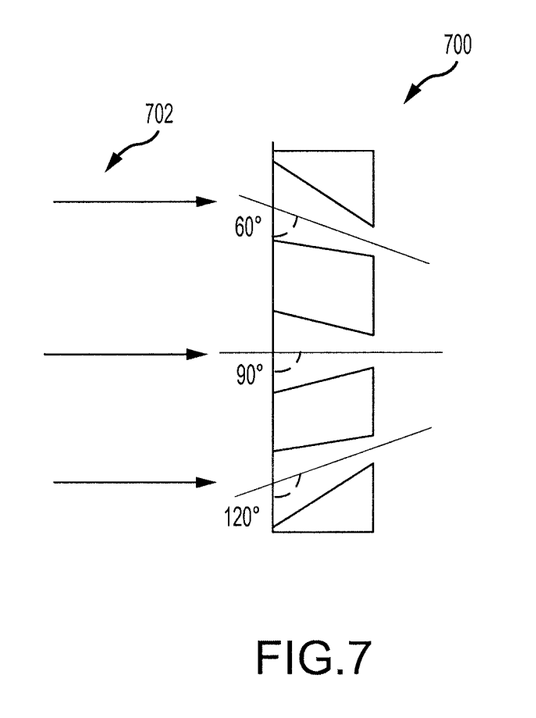
FIG. 7 illustrates a wall that forms various angles with a flowpath, in accordance with various embodiments.

The flow paths 206 may be straight or may have turns. As shown in FIG. 3, the first flow path 208 extends from the inlet 201 radially outward towards a wall 214, such as an outer diameter wall 214. An arrow 216 indicates a direction of flow of the gas. An outlet 220 (such as an outer outlet 220) may be designed to receive the gas from the first flow path 208 and port the gas out of the first flow path 208. The wall 214 may be oriented along a plane defined by the A axis and the C axis. In that regard, the wall 214 may form an angle 218 with the flow path 206. In various embodiments, the angle 218 may be between 30 degrees (30°) and 150°, between 50° and 130°, between 60° and 120°, or about 90°. Where used in this context, about refers to the referenced value plus or minus 10 percent (10%) of the referenced value. The angle 218 represents an angle between the wall 214 and the flow path 206. Referring briefly to FIG. 7, a wall 700 is shown that forms various angles with a flowpath 702. In particular, the wall 700 forms a 60° angle, a 90° angle, and a 120° angle.

Returning reference to FIG. 3, the gas may flow at a relatively great velocity through the first flow path 208. If debris is present in the gas, the debris may undesirably bond to the wall 214 in response to contact between debris and the wall 214. In that regard, it is desirable to reduce contact between debris and the wall 214. The wall 214 has been designed with various features to reduce such contact.

Figure 4A:
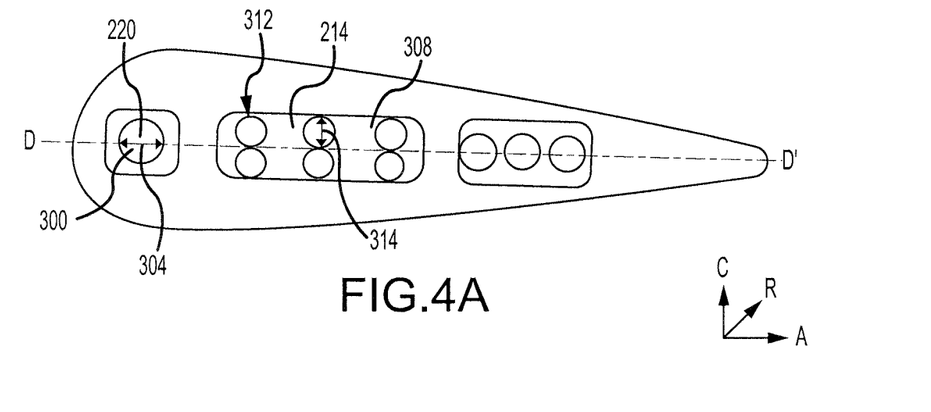
FIG. 4A illustrates a first surface of a wall of the blade of FIG. 3, in accordance with various embodiments.
Figure 4B:
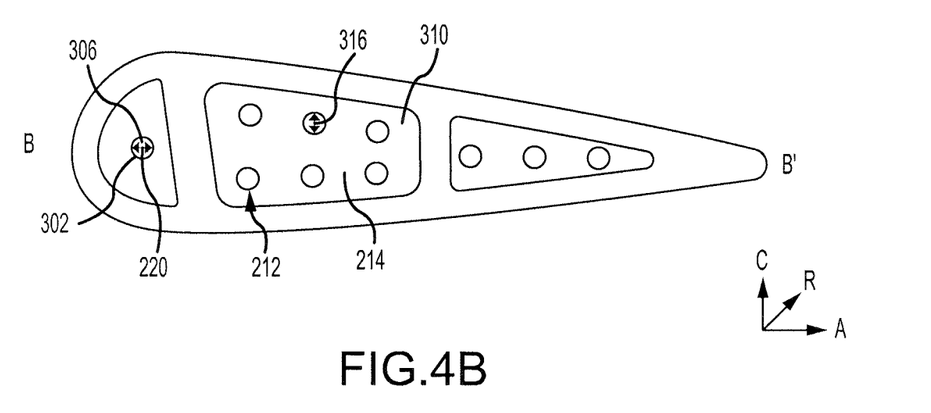
FIG. 4B illustrates a second surface of the wall of the blade of FIG. 3, in accordance with various embodiments.

In particular and referring to FIGS. 3, 4A, and 4B, a first surface 308 of the wall 214 (which faces the first flow path 208) is designed to have less surface area than a second surface 310 of the wall 214 (which may be opposite the first surface 308). In particular, the outlet 220 has a first portion 300 defined by the first surface 308 and a second portion 302 defined by the second surface 310. The first portion 300 has a first diameter 304, and the second portion 302 has a second diameter 306. The first diameter 304 may be greater than the second diameter 306. For example, the first diameter 304 may be at least 50% greater than the second diameter 306, at least 100% greater than the second diameter 306, at least 200% greater than the second diameter 306, or the like.

Figure 5:
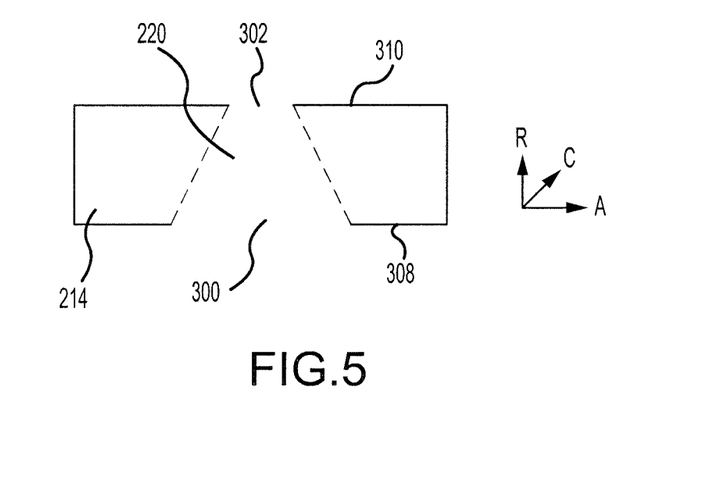
FIG. 5 illustrates an enlarged view of an outlet defined by the wall of FIG. 3, in accordance with various embodiments.

The wall 214 may include a plurality of outlets 312 including the outlet 220. The plurality of outlets 312 may each have first diameters 314 that are greater than second diameters 316. With brief reference to FIGS. 4A, 4B, and 5, the outlet 220 may have any shape so long as the first diameter 304 is greater than the second diameter 306. In various embodiments, the outlet 220 may be funnel-shaped and may funnel towards the second surface 310. In various embodiments, the intersection of the outlet 220 and the second surface 310 (and the first surface 308) may be a sharp edge, as shown, or may be a filleted edge.

Figure 6:
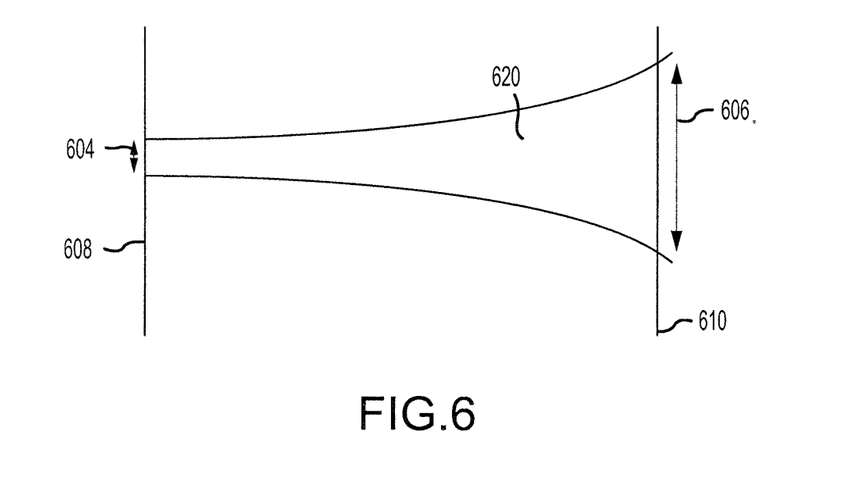
FIG. 6 illustrates an enlarged view of an outlet defined by a wall of a blade of a gas turbine engine, in accordance with various embodiments.

Referring briefly to FIG. 6, an outlet 620 may have an arced shape so long as a first diameter 604 at a first surface 608 is greater than a second diameter 606 at a second surface 610.

Returning reference to FIGS. 3, 4A, and 4B, the second flow path 210 may include multiple straight sections separated by turns. For example, the second flow path 210 may include a first straight section 222 and a second straight section 226 separated by a first turn 224. The gas may flow through the first straight section 222 from the second inlet 202, through the first turn 224, and then along the second straight section 226 as shown by an arrow 232. The first turn 224 may be at least partially defined by an inner wall 228. The gas along the first straight section 222 may be directed towards the inner wall 228 at an angle that is between 30° and 150°, between 50° and 130°, between 60° and 120°, or about 90°.

The inner wall 228 may define an inner outlet 230. The inner outlet 230 may have similar features as the outlet 220 in order to reduce contact between debris and the inner wall 228. For example, the inner wall may have a smaller surface area on a first surface that faces the second flow path 210 than a second surface area on a second surface that is opposite the first surface. Furthermore, the inner outlet 230 may have a first diameter on the first surface that is greater than a second diameter on the second surface.

The blade 100 may include a plurality of squealers on an outer diameter edge. In particular, the blade 100 may include a first squealer 234 and a second squealer 236. The squealers 234, 236 may be defined by a perimeter wall 238 and one or more rib 240. The squealers 234, 236 may be defined as cavities that receive the gas from the outlets 220. Inclusion of the squealers may advantageously decrease a weight of the blade 100, and may better distribute heat than a blade without squealers.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil for use in a gas turbine engine, comprising:
a channel configured to port a gas from an inlet along a flow path;
a wall defining a first outlet and a second outlet each configured to receive the gas, the first outlet forming a first angle measured from a plane perpendicular to the flow path that is between 60 degrees and 120 degrees and the second outlet forming a second angle with the flow path that is different than the first angle, the first outlet having a first portion with a first diameter and a second portion with a second diameter, the first portion configured to receive the gas before the second portion, and the first diameter being greater than the second diameter; and
a perimeter wall and a rib defining a squealer that is separate from the first outlet, the squealer configured to receive the gas from the first outlet,
wherein at least one of the first outlet or the second outlet has an arced shape.

2. The airfoil of claim 1, wherein the airfoil is a blade of a turbine section of the gas turbine engine.

3. The airfoil of claim 1, wherein the flow path has a first straight section, a first turn, and a second straight section such that the gas flows through the first straight section, then through the first turn, and then through the second straight section, wherein the wall defines a portion of the first turn.

4. The airfoil of claim 1, wherein the first outlet has a funnel shape that funnels from the first portion towards the second portion.

5. The airfoil of claim 4, wherein the wall has a first surface facing the flow path and having a first surface area, and a second surface opposite the first surface and having a second surface area that is less than the first surface area.

6. An airfoil for use in a gas turbine engine, comprising:
a channel configured to port a gas from an inlet along a flow path; and
a wall defining a first outlet and a second outlet each configured to receive the gas, the first outlet forming a first angle measured from a plane perpendicular to the flow path that is between 60 degrees and 120 degrees and the second outlet forming a second angle with the flow path that is different than the first angle, the wall having a first surface facing the flow path and having a first surface area, and a second surface opposite the first surface and having a second surface area that is less than the first surface area,
wherein at least one of the first outlet or the second outlet has an arced shape.

7. The airfoil of claim 6, wherein the first outlet has a first portion located on the first surface and having a first diameter, and a second portion located on the second surface and having a second diameter that is less than the first diameter.

8. The airfoil of claim 7, wherein the flow path has a first straight section, a first turn, and a second straight section such that the gas flows through the first straight section, then through the first turn, and then through the second straight section, wherein the wall defines a portion of the first turn.

9. The airfoil of claim 6, wherein the wall defines a plurality of outlets each having first portions with first diameters and second portions with second diameters that are less than the first diameters.

10. The airfoil of claim 6, further comprising a squealer configured to receive the gas from the first outlet.

11. The airfoil of claim 6, wherein the airfoil is a blade of a turbine section of the gas turbine engine.

12. The airfoil of claim 6, wherein the first outlet has a funnel shape that funnels from the first surface towards the second surface.

13. A turbine section of a gas turbine engine having an axis, the turbine section comprising:
a vane configured to turn exhaust; and
a blade configured to rotate about the axis and having:
a channel configured to port a gas from an inlet along a flow path, and
a wall defining a first outlet and a second outlet each configured to receive the gas, the first outlet forming a first angle measured from a plane perpendicular to the flow path that is between 60 degrees and 120 degrees and the second outlet forming a second angle with the flow path that is different than the first angle, the first outlet having a first portion with a first diameter and a second portion with a second diameter, the first portion configured to receive the gas before the second portion, and the first diameter being greater than the second diameter, wherein at least one of the first outlet or the second outlet has an arced shape.

14. The turbine section of claim 13, wherein the wall has a first surface facing the flow path and having a first surface area, and a second surface opposite the first surface and having a second surface area that is less than the first surface area.

15. The turbine section of claim 13, wherein the blade further includes a squealer, wherein the wall is an outer diameter wall, and the squealer is configured to receive the gas from the outlet.

16. The turbine section of claim 13, wherein the flow path has a first straight section, a first turn, and a second straight section such that the gas flows through the first straight section, then through the first turn, and then through the second straight section, wherein the wall defines a portion of the first turn.

* * * * *